United States Patent [19]

Gurevich et al.

[11] 4,131,493

[45] Dec. 26, 1978

[54] FLUX-CORED WELDING WIRE

[76] Inventors: Samuil M. Gurevich, Bulvar Lesi Ukrainki, 2, kv. 2; Vadim N. Zamkov, Bulvar Lesi Ukrainki, 2, kv. 8; Valery P. Prilutsky, ulitsa Nikolsko-Botanicheskaya, 15/17, kv. 4, all of Kiev, U.S.S.R.

[21] Appl. No.: 534,724

[22] Filed: Dec. 20, 1974

[30] Foreign Application Priority Data

Jan. 22, 1974 [SU] U.S.S.R. .............................. 1990025

[51] Int. Cl.$^2$ .............................................. B23K 35/34
[52] U.S. Cl. ........................................ 148/23; 148/26
[58] Field of Search .............................. 148/26, 22–25; 75/53, 57, 58; 219/137, 146

[56] References Cited

U.S. PATENT DOCUMENTS

| 2,360,717 | 10/1944 | Phelps | 75/53 |
|---|---|---|---|
| 2,470,763 | 5/1949 | Doyle | 148/26 |
| 2,814,559 | 11/1957 | Clark | 75/53 |
| 3,309,496 | 3/1967 | Rosenberg | 148/26 |
| 3,559,864 | 2/1971 | Hillert | 148/26 |
| 3,621,188 | 11/1971 | Joseph | 148/26 |
| 3,644,144 | 2/1972 | Timofeev | 148/26 |
| 3,849,211 | 11/1974 | Gurevich | 148/26 |

Primary Examiner—Peter D. Rosenberg
Attorney, Agent, or Firm—Lackenbach, Lilling & Siegel

[57] ABSTRACT

The flux-cored welding wire is intended to inert-gas shielded fusion welding of titanium and its alloys and includes a metal coating or tubular casting of titanium or its alloys and a powder flux core containing (per cent by weight):

$BaF_2$ — 5 to 10,
fluoride of a rare-earth element — 18 to 20,
$CaF_2$ — 40 to 50,
$SrF_2$ — the rest, the ratio of the weight content of the powder flux to the total weight content of titanium in the wire being from 0.3:1 to 1:1.

8 Claims, No Drawings

FLUX-CORED WELDING WIRE

The present invention relates to fluxes used in the art of welding and, more particularly, it relates to a flux-cored welding wire employed during inert-gas shielded fusion welding of titanium and its alloys.

The present invention can be used to utmost effectiveness during manufacture of welded structures of titanium and its alloys intended for operation in highly aggressive media, such as those encountered in chemical production, aviation and space vehicles and so on.

There is already known a flux-cored welding wire for inert-gas shielded fusion welding of titanium and its alloys, said wire including a coating of titanium or its alloys and a powder flux core including calcium fluoride and strontium fluoride.

This flux-cored welding wire can be used for welding metal of a thickness up to 16 mm without grooving with a single pass, in cases where a reinforced weld is not required. When welding metal 10 mm thick or thicker without grooving with a single pass with this wire, a reinforced or convex weld cannot be produced because the amount of the metal in the coating of the wire is not sufficient for a reinforced weld, although this kind of weld may be necessary in a number of heavy-duty structures, e.g. those of high-pressure vessels and the like.

Thus, in order to obtain a convex or reinforced weld, it is necessary to perform a second pass with the electrode being fed. However, before this second pass can be performed, it is essential that the slag left on the surface of the weld should be removed with a scraper blade, or with a rotary steel brush or otherwise, which constitutes a labor-consuming operation and adversely affects the productivity of labor diving welding.

Should the welding be performed with the feed of the flux onto the slag that has not been removed, the weld thus obtained would in most cases have such defects as, for example, cracks. Therefore, it has been found that in order to obtain a quality weld of relatively thick structures (10 mm and thicker) with the heretofore known flux-cored wire, it is necessary to resort to an additional labor-consuming operation of removing the slag from the weld surface and to a second welding pass with the feed of the flux-cored welding wire to ensure a reinforced weld. Besides, the impact strength of the metal of the weld obtained with the heretofore known welding wire of titanium and its alloys has been found to be lower than that of the metal proper.

It is an object of the present invention to create a flux-cored welding wire which should provide for obtaining reinforced welds without grooving with a single pass, during welding of metal structures having a thickness in excess of 10 mm.

It is another object of the present invention to provide a flux-cored welding wire which should ensure that the slag formed during welding with this wire would be readily removable from the surface of the weld and, which, whenever necessary (e.g. during welding of circular welds with grooving of metal structures 20 mm thick and thicker) would permit the superimposing of successive welds without removing the slag in advance.

It is still another object of the present invention to provide a flux-cored welding wire which, when employed during welding of titanium and low-alloy titanium, should ensure the impact strength of the metal of the weld at the level of that of the metal proper.

These and other objects are attained in a flux-cored welding wire for inert-gas shielded fusion welding of titanium and its alloys, said wire having a coating or tubular casing (shell) of titanium and/or its alloys and a powder flux core containing $CaF_2$ and $SrF_2$, the powder flux additionally containing $BaF_2$ in a quantity of 5 to 10 percent by weight and a rare-earth element fluoride in a quantity of 18 to 20 percent by weight, the content of the other components being, as follows (percent by weight): $CaF_2$ — 40 to 50, $SrF_2$ — the rest, and the ratio of the weight of the powder flux to the total weight content of titanium in the wire being from 0.3:1 to 1:1.

A modification of the flux-cored welding wire, in accordance with the present invention, is a wire reinforced with elements of titanium and/or its alloys.

It is preferred that the fluoride of a rare-earth element should be lanthanum fluoride.

It is alternatively preferred that the fluoride of a rare-earth element should be cerium fluoride.

The essence of the present invention is, as follows.

The herein disclosed welding wire has been found to feature an improved build-up factor, which provides for obtaining convex reinforced welds. The improved build-up factor has been attained through to the selection of the herein disclosed ratio of the weight of the powder flux to the total weight content of titanium in the welding wire, the ratio having a range from 0.3:1 to 1:1.

Practically, this ratio can be attained by reinforcing the wire with elements made of titanium and/or its alloys in the form of slim rods extending axially of the wire within the latter. The rods are preferably in the form of cut lengths of a wire made from titanium alloys, since such wire is the most commonly used welding material.

Alternatively, the wire can be reinforced by embedding granules of titanium alloys within the flux body, the granules being uniformly distributed longitudinally of the wire. Reinforcement with such granules can be recommended in cases where reinforcement with cut lengths as a continuous operation is less preferable from the point of view of the technology of welding wire production.

It is also possible to arrange the thin reinforcement rods transversely of the wire, their length in this case spanning the diameter of the wire.

Furthermore, the ratio of the weight of the powder flux to that of titanium has been selected so that, on the one hand, the degree of fusion penetration should be a maximum, and, on the other hand, the reinforcement of the weld should depend on the thickness of the metal structure being welded.

Thus, should the ratio of the weight of the powder flux to that of titanium be below 0.3:1, the penetration of the metal is affected on account of a reduced factor of welding arc contraction.

On the other hand, should the ratio of the weight of the powder flux to that of titanium exceed 1:1, the outcome would be a less stable arc and a poorer reinforcement of the weld.

The herein disclosed weight content of calcium fluoride in combination with strontium fluoride provides for the necessary stabilization of the arc and the contraction of the latter as the flux is introduced into the welding bath. With the calcium fluoride content short of 40 percent by weight and, with the strontium fluoride content short of 20 percent by weight both stabilization and contraction of the arc are affected, and the reinforcement of the weld obtained is of a poor shape.

With the calcium fluoride content being in excess of 50 percent by weight and with the strontium fluoride content being in excess of 37 percent by weight the removal of the slag from the surface of the weld is seriously impeded.

With the barium fluoride content in the flux in excess of 10 percent by weight the stability of the arc is affected, whereas with the weight content of barium fluoride below 5 percent removal of the slag is obstructed.

The presence in the powder flux of a rare earth element fluoride in a quantity of 18 to 20 percent by weight has been found to increase the impact strength of the metal of the weld 1.5 times in the case of commercially pure titanium, as compared with the heretofore known wire.

With the rare-earth element fluoride content short of 18 percent by weight it has been found difficult to attain a stable value of the impact strength.

The fluoride of the rare-earth element is preferably either lanthanum fluoride or cerium fluoride, the reason being their availability on the market.

Other advantages offered by the herein disclosed flux-cored welding wire for inert-gas shielded fusion welding of titanium and its alloys will be made apparent from the detailed description of the embodiments hereinbelow.

EXAMPLE 1

To perform welding of longitudinal seams with 10 mm thick pieces of commercially pure titanium there is selected a flux-cored wire 3.0 mm in diameter of the following structure:

A coating or tubular casing of titanium and the powder flux core containing (percent by weight) —

$BaF_2$ — 5,
$CaF_2$ — 50,
$SrF_2$ — 25,
$LaF_3$ — 20, the ratio of the weight of the powder flux to the total weight content of titanium being 0.3:1.

The welding is performed with a nonconsumable electrode in an argon atmosphere at a speed of 10 m/hour, the welding current being 430A–450A.

The outcome: the weld is reinforced to a height of 2 mm and the impact strength "$a_n$" is 18–19 kg.m/cm$^2$.

EXAMPLE 2

To perform circular welding of 14 mm thick pieces of a Ti - 3 Al - 1.5 Mn alloy system there is selected a flux-cored wire 3.5 mm in diameter, reinfoced with a 2.0 mm dia. titanium rod extending longitudinally of the wire within the powder flux.

The welding is performed at a speed of 10 m/hour, the welding current being 450 A–470 A.

In this example the coating or tubular casing of the wire is of the Ti - 3Al - 1.5 Mn alloy system, the powder flux having the following composition (percent by weight):

$BaF_2$ — 10,
$CaF_2$ — 40,
$SrF_2$ — 32
$LaF_3$ — 18

The ratio of the weight of the powder flux to the weight content of the metal, i.e. of titanium, is 0.5:1.

The outcome: the weld is reinforced to a height of 3 mm and the impact strength "$a_n$" is 8–9 kg.m/cm$^2$.

EXAMPLE 3

Manual welding of pieces of commercially pure titanium, 10 mm thick, in spots with obstructed access is performed with a welding wire 4.0 mm in diameter, reinforced with a 1 mm dia. rod extending within the powder flux longitudinally of the wire.

The ratio of the weight of the flux to that of titanium is 0.8:1.

The welding is performed with a 300 A current, the coating or tubular casing of the wire being of commercially pure titanium and the powder flux core thereof containing (percent by weight):

$BaF_2$ — 7,
$CaF_2$ — 45,
$SrF_2$ — 30,
$CeF_3$ — 18.

The outcome: the weld is reinforced to a height of 3 mm and the impact strength "$a_n$" is 16–17 kg.m/cm$^2$.

EXAMPLE 4

To weld titanium alloys, in cases where the chemical composition of the weld should approximate that of the metal proper, there is used a flux-cored welding wire reinforced with granules of the metal proper uniformly distributed throughout the volume of the powder flux.

In such cases the ratio of the weight of the powder flux to the total weight content of titanium in the wire is 1:1.

The flux contains (percent by weight):

$BaF_2$ — 8,
$CaF_2$ — 40,
$SrF_2$ — 32,
$La F_3$ — 20.

The outcome: the weld is reinforced to a height of 2.0 mm and the impact strength "$a_n$" is not below 80 percent that of the metal proper.

EXAMPLE 5

For multi-layer welding of pieces of titanium alloys Ti - 3Al - 1.5 Mn, of a thickness of 25 mm, in order to prevent the eventuality of leaving voids in the welded seams, there is used a 4.5 mm diameter welding fluxed-core wire to fill in the grooves. The wire is reinforced with three, each rods 1 mm in diameter, extending longitudinally of the wire adjacent to the periphery thereof. The ratio of the weight of the powder flux to the weight content of titanium is 0.3:1.

The powder flux contains (percent by weight):

$BaF_2$ — 10,
$CaF_2$ — 50,
$SrF_2$ — 20,
$CeF_3$ — 20.

The outcome: the impact strength of the weld is 7–8 kg.m/cm$^2$.

The use of the herein disclosed welding wire during argon-shielded welding with a nonconsumable electrode of titanium pieces without grooving has enabled a seam to form in a single pass, and with the quality of the weld being stepped up owing to the absence of voids and pores and to the weld being reinforced the necessity of an additional pass has been eliminated. Thus, the productivity of the welding operation has been considerably increased in comparison with the use of the heretofore known flux means.

When the herein disclosed welding wire is used during automatic welding, no rearrangement or readjustment of the existing equipment is required, since the wire is fed into the welding zone exactly in the same way as the heretofore known and employed flux wire was fed. The herein disclosed fluxed-core welding wire can also be used as the flux-yielding medium in the case of a manual argon-shielded arc welding of titanium and its alloys. In either case protection of the cooling metal of the weld is facilitated, since there is left on its surface a layer of hardened slag.

What we claim is:

1. A fluxed-core wire for inert-gas shielded fusion welding of titanium and its alloys, comprising a tubular casing made of a metal selected from a group including titanium and its alloys and a powder flux core consisting essentially of (percent by weight):

$CaF_2$ — 40 to 50,
$BaF_2$ — 5 to 10,
a fluoride of a rare-earth element — 18 to 20, and
$SrF_2$ — the rest, the ratio of the weight of the powder flux to the total weight content of titanium in said wire being from about 0.3:1 to 1:1.

2. A fluxed-core wire as claimed in claim 1 reinforced with at least one element made of a metal selected from a group including titanium and its alloys.

3. A fluxed-core wire as claimed in claim 1, wherein said fluoride of a rare-earth element is $LaF_3$.

4. A fluxed-core wire as claimed in claim 1, wherein said fluoride of a rare-earth element is $CeF_3$.

5. A fluxed-core wire as claimed in claim 2, wherein said reinforcing element extends longitudinally of the wire within said powder flux.

6. A fluxed-core wire as claimed in claim 2, wherein three reinforcing elements extend longitudinally of the wire adjacent to the periphery of said tubular casing and within same.

7. A fluxed-core wire as claimed in claim 2, wherein a plurality of reinforcing elements are disposed transversely of the wire within said tubular casing.

8. A fluxed-core wire as claimed in claim 1 reinforced with granules of a metal selected from a group including titanium and its alloys, and said granules being uniformly distributed in said powder flux.

* * * * *